United States Patent [19]

Lunsford

[11] Patent Number: 5,041,962
[45] Date of Patent: Aug. 20, 1991

[54] COMPUTER SYSTEM WITH MEANS FOR REGULATING EFFECTIVE PROCESSING RATES

[75] Inventor: David R. Lunsford, Austin, Tex.

[73] Assignee: Dell USA Corporation, Austin, Tex.

[21] Appl. No.: 338,066

[22] Filed: Apr. 14, 1989

[51] Int. Cl.[5] .......................................... G06F 13/362
[52] U.S. Cl. .................................. 364/200; 364/270; 364/243.41; 364/240.5
[58] Field of Search ..................... 364/200 MS File

[56] References Cited

U.S. PATENT DOCUMENTS

| | | | |
|---|---|---|---|
| 3,845,474 | 10/1974 | Lange et al. | 364/200 |
| 3,979,726 | 9/1976 | Lange et al. | 364/200 |
| 4,228,503 | 10/1980 | Waite et al. | 364/200 |
| 4,258,417 | 3/1981 | Berglund et al. | 364/200 |
| 4,426,682 | 1/1984 | Riffe et al. | 364/200 |
| 4,438,490 | 8/1984 | Wilder, Jr. | 364/200 |
| 4,661,905 | 4/1987 | Bomba et al. | 364/200 |
| 4,912,632 | 3/1990 | Gach et al. | 364/200 |
| 4,933,835 | 6/1990 | Sachs et al. | 364/200 |

Primary Examiner—Gareth D. Shaw
Assistant Examiner—Kakali Chaki
Attorney, Agent, or Firm—Thomas G. Devine

[57] ABSTRACT

A digital computer system having a local cache memory and a system bus also has a subsystem for regulating the effective processing rate of the central processor unit (CPU) of the computer system. A programmable counter/timer is programmed by data from the CPU to provide a periodic pulse of desired periodicity and pulse width for entry into a bus controller. The bus controller arbitrates use of the system bus, sending a request signal to the CPU requesting the CPU to relinquish use of the bus and it receives an acknowledgement signal from the CPU indicating its relinquishment of use of the bus. The local cache memory is flushed through the cache controller to prevent the CPU from using the local cache memory. This causes the CPU to be periodically active when using the system bus and periodically inactive when the system bus is relinquished, thereby establishing the effective processing rate of the CPU as set by the programmable counter/timer.

10 Claims, 4 Drawing Sheets

COMPUTER SYSTEM WITH MEANS FOR REGULATING EFFECTIVE PROCESSING RATES

BACKGROUND OF THE INVENTION

1. Field of the Invention

This invention relates to digital computer systems. More specifically, it relates to digital computer systems having subsystems for regulating the effective processing rate of the central processing unit (CPU).

2. Description of the Prior Art

Certain application programs exist that require a known processing rate to execute in an optimal fashion. For example, a tutorial utilizes software timing loops to sequence images or text across the display of a digital computer system. With the advent of much higher clock speeds for a given processor, and high performance cache memory subsystems, existing techniques for regulating processing rates are not adequate. In the past, in the faster machines, the prior art method of handling the problem has been to provide a "compatibility speed" that forces a high-speed computer (20 Mhz+) to run at a slower speed to emulate a 6 Mhz to 8 Mhz computer. The frequency switch is handled, in most cases, in real time by writing a data value to an I/O port to select a frequency through a multiplexer. The weaknesses in this implementation are the requirement for multiple oscillators, extra circuitry to perform a smooth transition between the two frequencies, and a CPU that has a minimum operating frequency that is lower than the "compatibility" frequency. An additional weakness is that it requires the CPU to be able to dynamically change clock frequencies. Future computer systems may implement internal clocking schemes based on phase locked loops that preclude rapid dynamic change in clocking frequencies because of the inability of the input and output circuits to respond in a timely fashion.

Another prior art system is the insertion of wait states into the main memory subsystem. This technique essentially slows the processing rate of the system by forcing the CPU to artifically wait for memory cycles to complete. This system has the disadvantage of abbreviating the addresses and decoding of addresses at the beginning of the cycle. Also, when the system includes a local cache memory, the cache may contain the particular instruction loop in which event, the insertion of wait states would be ineffective.

Still another prior art method is regulating the processing rate through band width modulation of the system bus. This technique may be used to provide the reduced processing rate by using up time during which the processor must wait. This can be done by extending memory refresh cycles or by providing another "master" that cycles the available bus time between "available" and "busy." The ratio of "available" time to "busy" time multiplied by the relative speed factor of the processor can be derived to yield the effective processing rate desired. However, this system will not perform the desired function in concurrent bus architecture systems that include a local cache memory. In such a system, having the bus in a "busy" state does not preclude the processing of code already contained in the cache memory.

BRIEF SUMMARY OF THE INVENTION

This invention provides the ability to regulate the effective processing rate in cache based computing systems with or without a concurrent bus architecture. This is done without requiring a change in the CPU clock speed. The system involves flushing or disabling the cache memory when changing to the "compatibility" speed.

In this preferred embodiment, the circuit provided in the system for memory refresh is used to provide a periodic pulse. This periodic pulse is applied to the system bus controller which is used in arbitrating the use of the system bus. When the periodic pulse is received, the bus controller sends a request signal to the CPU requesting the CPU to relinquish use of the bus. The CPU will then relinquish use of the bus. With the local cache memory having been flushed, the CPU is effectively cut off from referencing the cache and is, therefore, made inactive when it relinquishes use of the system bus.

When the periodic pulse is terminated, the bus controller permits the CPU to again access the system bus, permitting the CPU to be active.

The source of the periodic pulse is a programmable timer/counter which provides adjustable pulse width of the periodic pulse as well as its periodicity. By adjusting these parameters, the CPU is inactive and then active, successively, in a ratio as desired. This results in an effective rate for the CPU that is ultimately determined by the output of the programmable timer/counter, namely, the periodic pulse.

The principal object of this invention is to provide a system for regulating the effective processing rate of a central processor unit (CPU) of a computer system to emulate the processing speed of a slower, compatible, computing CPU.

This and other objects will be made evident in the detailed description that follows.

DETAILED DESCRIPTION OF THE INVENTION

The problem solved by this invention is regulating the effective processing rate of a digital computer system without altering the clock frequency of that system. "Compatability speed" is developed to emulate the processing speed of a slower though architecturally compatible digital computer system. The following detailed description enables a thorough understanding of this invention.

Figure 1:
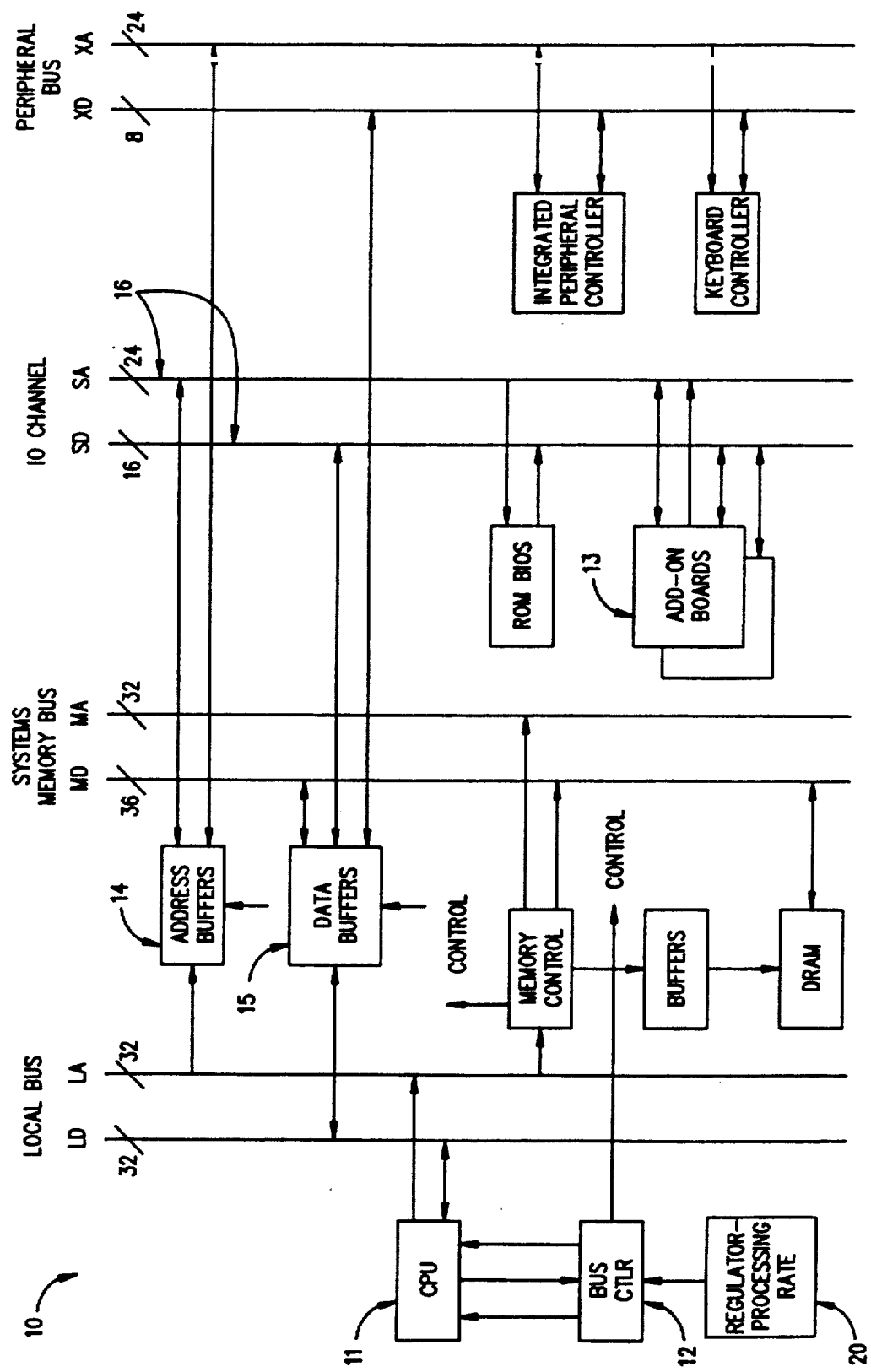
FIG. 1 is a block diagram of the computer system of this invention.

FIG. 1 is a block diagram of the digital computer system 10 of this invention. CPU 11 is shown bilaterally interconnected with bus controller 12. Processing rate regulator 20 is shown having an input into bus controller 12. The remaining components of the digital computer system 10 which are shown in FIG. 1 are not directly involved in this invention and will not be described herein. For a thorough understanding of these components, reference should be made to Chips and Technologies, Inc. publications "82C206-Integrated Peripherals Controller" and "82C301, 82C302, 82A303, 82A304, 82A305, 82A306, CS8230: AT/386 CHIP-Set TM", original copyright 1985. In this preferred embodiment, CPU 11 is a Type 80386 Processor manufactured by Intel Corporation. Bus controller 12 is a Type 82C301 Bus Controller manufactured by Chips and Technologies, Inc.

Figure 2:
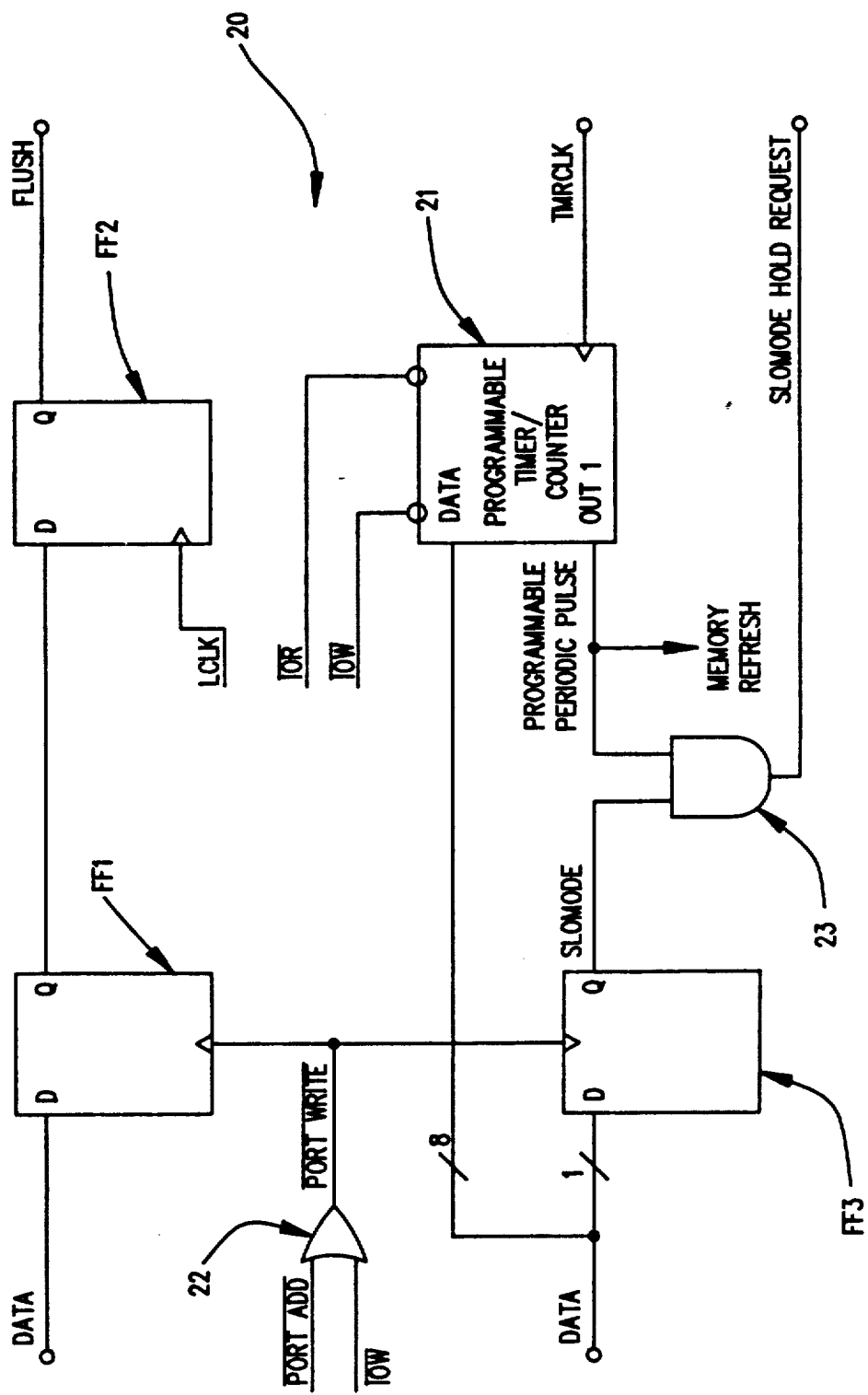
FIG. 2 is a block diagram of the processing rate regulator of this invention.

FIG. 2 illustrates processing rate regulator 20. Signals PORT ADD and IOW from CPU 11 are input into OR gate 22 whose output is signal PORT WRITE. Signal PORT WRITE is used to clock flip-flops FF1 and FF3. Data from CPU 11 is input to the D input of flip-flop FF1 whose Q output is connected to the D input of flip-flop FF2. Flip-flop FF2 is clocked by LCLK, the system clock. The Q output of flip-flop FF2 is a FLUSH signal which is sent to the cache controller, to be described later.

Data is sent to flip-flop FF3 (1 bit) and also to programmable timer/counter 21 (8 bits). Flip-flop FF3 provides, on its Q output, the signal SLOMODE which provides one input to AND gate 23. Programmable timer/counter 21 is clocked by signal TMRCLK from a separate timing source.

In this preferred embodiment, the frequency of signal TMRCLK is 1.19 Mhz. Signals IOR and IOW indicate whether information is to be read from or written into programmable timer/counter 21. The output of unit 21, the Programmable Periodic Pulse, provides the other input to AND gate 23, the output of which is the SLO-MODE HOLD REQUEST which is sent to bus controller 12.

Figure 3:
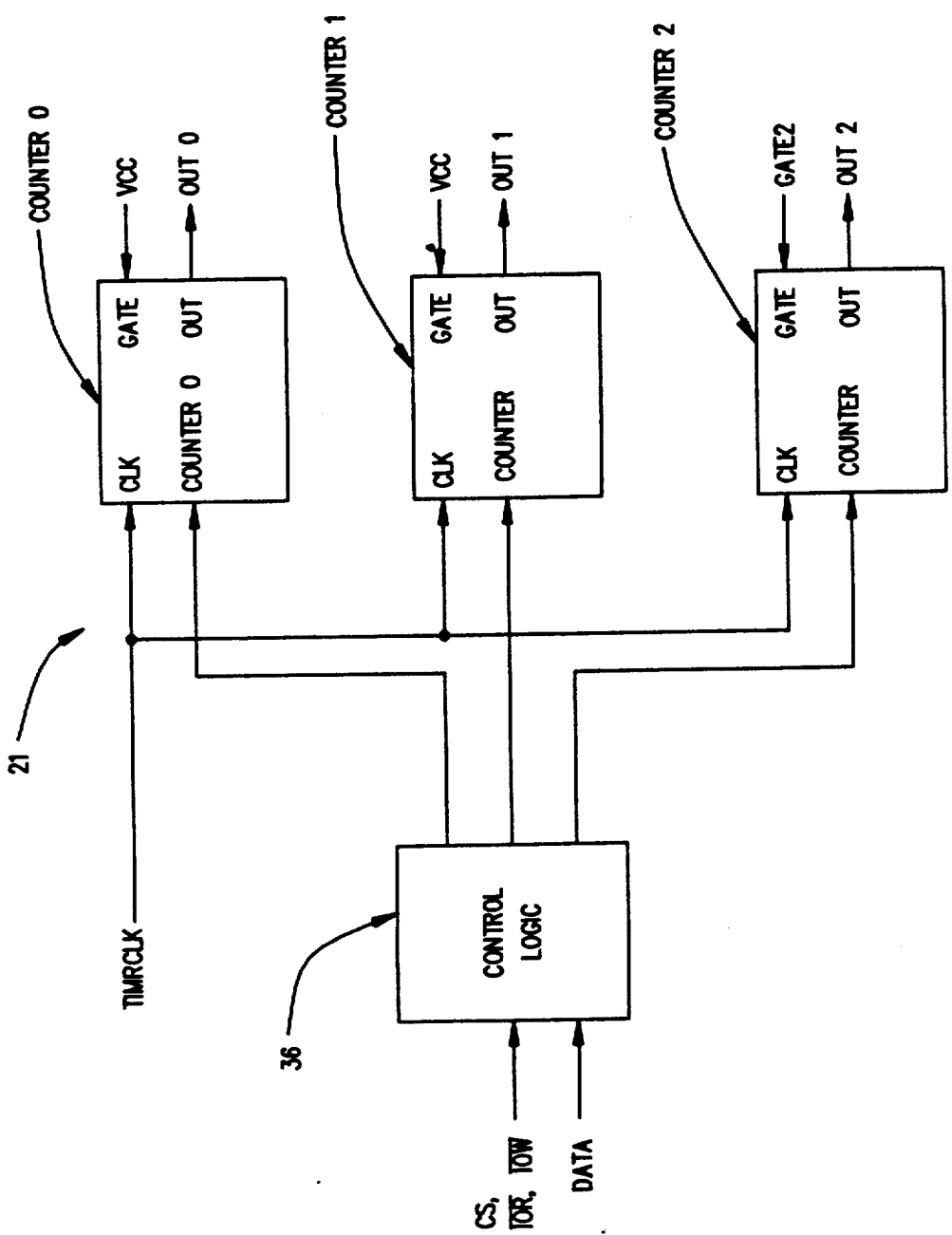
FIG. 3 is a block diagram of the programmable timer/counter of this invention.

FIG. 3 illustrates programmable timer/counter 21 in block form. Control logic 36 receives inputs IOR, IOW, and chip select (CS) as well as DATA. Control logic 36 is connected to each of counters 37, 38 and 39. DATA input to control logic 36 is used to set the periodicity and pulse width output from timer/counter 21. In this preferred embodiment, counter 1 is used to provide the periodic pulse. It also is used in normal operation, as a refresh memory pulse, as indicated in FIG. 2. For a detailed description of programmable timer/counter 21, see the aforesaid Chips and Technologies, Inc. publication "82C206—Integrated Peripherals Controller", starting at page 30.

Figure 4:
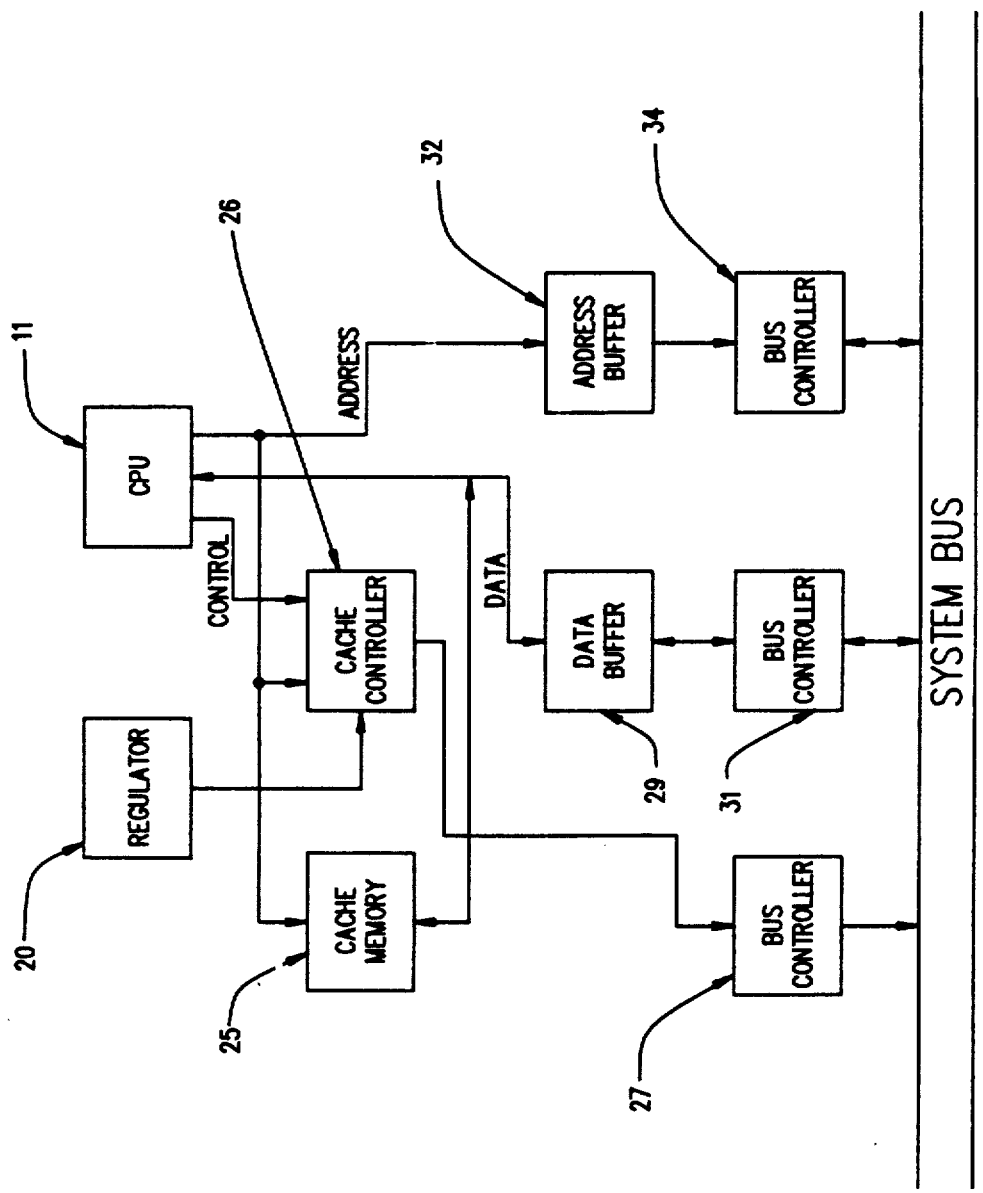
FIG. 4 is a block diagram of the CPU, cache memory, and cache controller of this invention.

FIG. 4 illustrates, in block form, the relationship of cache memory 25 and cache controller 26 to CPU 11. Also, processing rate regulator 20 is shown as providing input to cache controller 26. Cache controller 26, in this preferred embodiment, is an Intel Type 82385 High Performance 32-Byte Cache Controller, which is described in detail starting at page 4-292 in Intel, Vol. I—Microprocessor—"Microprocessor and Peripheral Handbook", copyright 1988. The principal purpose of cache memory 26 is to provide fast, local storage for CPU 11 for frequently accessed code and data. Thus, CPU 11 looks first to cache memory 25 for information and, if not there, then must proceed to the main memory. As shown, CPU 11 has an address line connected to address buffer 32 which connects to bus controller 34 which, in turn, is connected to the system bus. CPU 11 has a data line connected to data buffer 29, through bus controller 31 to the system bus. Cache controller 26 is connected to CPU 11 through a control line and also connects to cache memory 25. Other output from cache controller 26 is connected to the system bus through bus controller 27.

MODE OF OPERATION OF THE INVENTION

When a "compatibility speed" is needed to emulate the processing speed of a slower digital computer system, flip-flop FF3 of FIG. 2 is set to provide a SLO-MODE signal output. At the same time, data from CPU 11 programs programmable timer/counter 21 to provide a Programmable Periodic Pulse output at a desired frequency and with a desired pulse width. This is accomplished by appropriate data being applied to control logic 36 of programmable timer/counter 21 as shown in FIG. 3. Counter 1 is selected and outputs the desired periodic pulse on OUT 1. The SLOMODE signal is combined with the periodic pulse in AND gate 23 to provide a SLOWMODE HOLD REQUEST signal that is applied to bus controller 12 which controls all bus activity and provides arbitration between CPU 11 and the memory refresh which, in this preferred embodiment, is the periodic pulse. Bus controller 12, described in detail in the aforesaid publication "CS8230: AT/386 CHIPSet TM", sends a hold request to CPU 11. CPU 11 relinquishes control of the system bus, indicated by hold acknowledge reply to bus controller 12. Referring to FIG. 4, FLUSH output signal from flip-flop FF2 is supplied to cache controller 26. As indicated earlier, the principal function of cache memory 25 is to provide frequently accessed information for use by CPU 11. If the cache system were perfect, the "hit rate" would be 100 percent. That is, all memory references from CPU 11 would be handled through cache memory 25 with no requirement to go to main memory through the system bus. Obviously, under such a circumstance, system bus arbitration would have no effect on the operational speed of CPU 11. As it is, CPU 11 would keep on operating through cache memory 25 without any need for the system bus. However, the FLUSH signal causes the cache controller 26 to invalidate all data which had been previously cached. Specifically, all tagged valid bytes are cleared. Therefore, the cache is effectively empty and subsequent references are misses, causing CPU 11 to communicate with the system bus. CPU 11 then is active when it has use of the system bus and it is completely inactive when it has relinquished use of the system bus. Adjusting the ouptut OUT1 from counter 1 of FIG. 3, the active-inactive time is set to provide the effective processing rate of CPU 11.

Those skilled in the art may alter specific circuits, select different components, change frequencies, etc. all without departing from the spirit and scope of this invention which is limited only by the appended claims.

The invention claimed is:

1. A digital computer system having a local cache memory, a system bus and a subsystem for regulating the effective processing rate of the central processor unit (CPU) of the computer system, comprising:
    (a) a bus controller, connected to the CPU for sending a request signal to the CPU requesting the CPU to relinquish use of the bus;
    (b) flushing means, connected to receive a command from the CPU to flush the local cache memory to prevent the CPU from using it, thereby causing the CPU to attempt to use the system bus; and
    (c) bus requesting means, connected to receive commands from the CPU to periodically request use of the system bus by transmitting a periodic pulse to the bus controller to cause the CPU to periodically relinquish use of the system bus and at the same time be unable to use the local cache memory causing the CPU to be periodically inactive, and to be periodically active when using the system bus, thereby establishing the effective processing rate of the CPU.

2. The digital computer system of claim 1 wherein the bus requesting means comprises a programmable counter/timer to provide a periodic pulse to the bus controller.

3. The digital computer system of claim 2 wherein the bus requesting means further comprises a timing source for clocking the counter/timer.

4. The digital computer system of claim 3 further comprising means for programming the programmable counter/timer by data input from the CPU for outputting the desired periodicity and pulse width of the periodic pulse.

5. The digital computer of claim 1 wherein the flushing means comprises flush circuitry for receiving data from the CPU and generating a flush signal in response thereto.

6. The digital computer of claim 5 wherein the flushing means further comprises a cache controller for receiving the flush signal, and in response thereto invalidating all data previously stored in the locale cache memory.

7. A digital computer system having a local cache memory, a system bus and a subsystem for regulating the effective processing rate of the central processing unit (CPU) of the computer system, comprising:
  (a) a bus controller, connected to the CPU for sending a request signal to the CPU requesting the CPU to relinquish use of the bus;
  (b) flush circuitry for receiving data from the CPU and generating a flush signal in response thereto;
  (c) a cache controller, connected to control the local cache memory, for receiving the flush signal and in response thereto, invalidating all data previously stored in local cache memory to prevent the CPU from using the local cache memory when the CPU relinquishes use of the system bus; and
  (d) bus requesting means, connected to receive commands from the CPU to periodically request use of the system bus by transmitting a periodic pulse to the bus controller to cause the CPU to periodically relinquish use of the system bus and at the same time be unable to use the flushed, local cache memory causing the CPU to be periodically inactive and to be periodically active when using the system bus, thereby establishing the effective processing rate of the CPU, wherein the bus requesting means comprises a programmable counter/timer to provide a periodic pulse to the bus controller, a timing source for clocking the counter/timer, and means for programming the counter/timer by data input from the CPU for outputting the desired periodicity and pulse width of the periodic pulse.

8. A method of regulating the effective processing rate of the central processing unit (CPU) of a digital computer system, having a system bus, a subsystem for regulating the effective processing rate of the CPU, and a local cache memory, comprising the steps of:
  (a) invalidating all data in the local cache memory by command from the CPU, to cause the local cache memory to be inaccessible to the CPU causing the CPU to be inactive when it has relinquished use of the system bus;
  (b) periodically requesting use of the system bus by the subsystem to cause the CPU to periodically relinquish use of the system bus; and
  (c) periodically relinquishing use of the system bus by the subsystem for causing the CPU to be periodically active.

9. The method of claim 8 wherein steps (b) and (c) are resolved by arbitrating the use of the system bus.

10. The method of claim 9 further comprising the step of adjusting the effective rate of the CPU by changing the periodicity of steps (b) and (c).

* * * * *